United States Patent [19]

Ramsey, Jr.

[11] 3,718,861
[45] Feb. 27, 1973

[54] ELECTROLYTIC CAULOMETER FOR INTEGRATING VOLTAGE AND CURRENT COMPONENTS OF POWER

[75] Inventor: James E. Ramsey, Jr., Raleigh, N.C.
[73] Assignee: Westinghouse Electric Corporation, Pittsburgh, Pa.
[22] Filed: Dec. 17, 1970
[21] Appl. No.: 99,093

Related U.S. Application Data

[63] Continuation-in-part of Ser. No. 793,052, Jan. 22, 1969, abandoned.

[52] U.S. Cl.....................................324/142, 324/94
[51] Int. Cl..........................G01r 21/00, G01r 11/44
[58] Field of Search..........................324/94, 142, 182

[56] References Cited

UNITED STATES PATENTS

| 3,343,084 | 9/1967 | Gambale et al | 324/142 X |
| 3,343,083 | 9/1967 | Beusman | 324/94 |
| 3,428,894 | 2/1969 | Boettcher | 324/94 |
| 3,321,635 | 5/1967 | Jacobs | 324/182 X |
| 3,255,413 | 6/1966 | Narwell et al | 324/182 X |

Primary Examiner—Alfred E. Smith
Attorney—A. T. Stratton and C. L. Freedman

[57] ABSTRACT

A device for measuring the quantity of a direct current flow therethrough comprises a glass tube having a body of mercury at each end which serves as an electrode. The two electrodes are separated by an electrolyte such as a mercury-salt solution. For integrating a function of the voltage and current in an electric circuit a transducer such as a Hall generator converts the function into an output current having a direct-current component which is passed through the contents of the tube. The mercury-salt solution then moves in a direction dependent on the direction of the direct current passing therethrough. The position of the mercury-salt solution represents the desired integration. The direction of the current through the tube may be reversed after each reading or it may be reversed when the mercury-salt solution arrives at predetermined positions respectively adjacent the ends of the tube.

4 Claims, 9 Drawing Figures

PATENTED FEB 27 1973
3,718,861
SHEET 1 OF 2
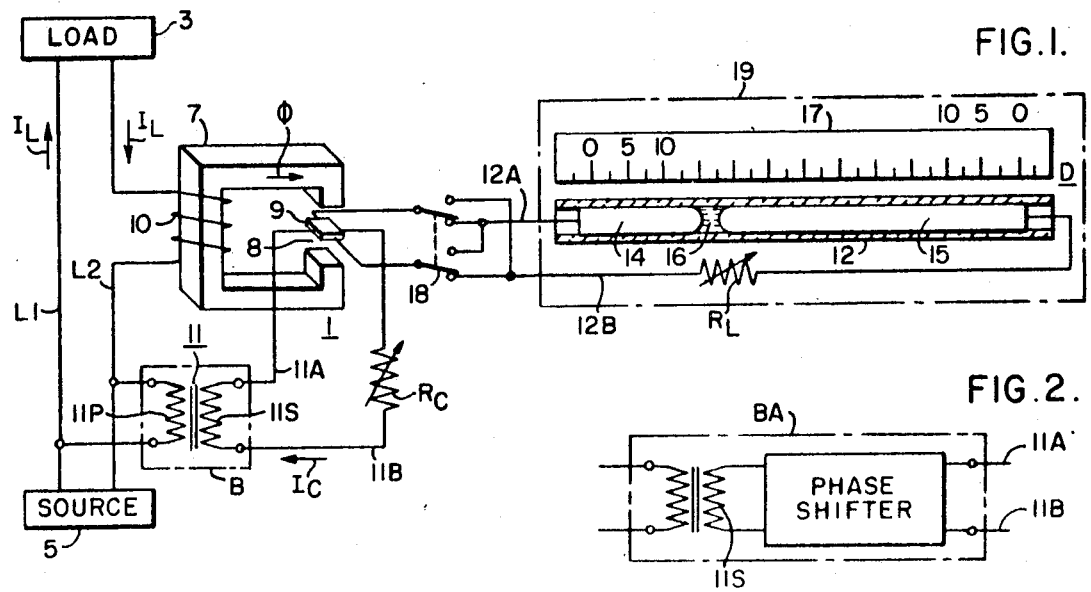
FIG. 1.
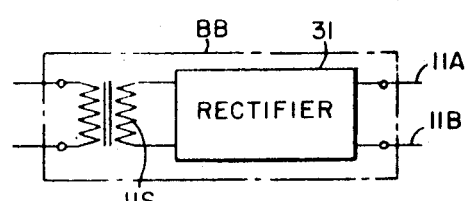
FIG. 2.
FIG. 4.
FIG. 3.
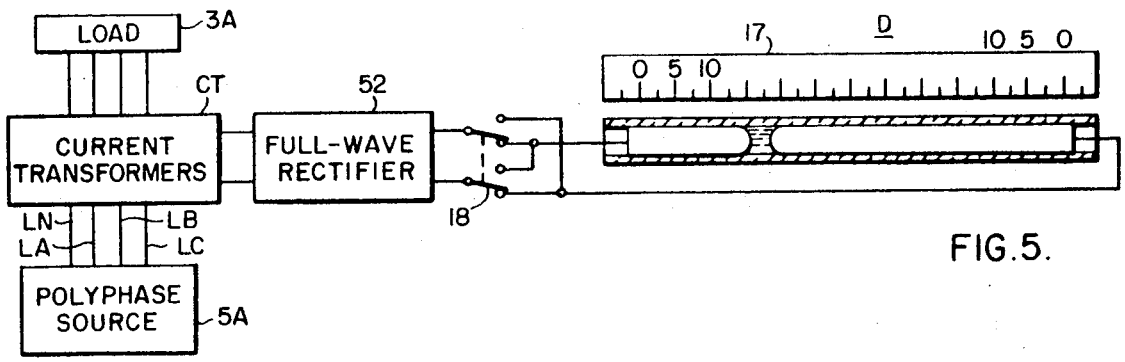
FIG. 5.
WITNESSES:
Bernard R. Gieguay
James F. Young
INVENTOR
James E. Ramsey, Jr.
BY R L Friedman
ATTORNEY

ELECTROLYTIC CAULOMETER FOR INTEGRATING VOLTAGE AND CURRENT COMPONENTS OF POWER

CROSS REFERENCE TO RELATED APPLICATION

This is a continuation-in-part of my U.S. Pat. application, Ser. No. 793,052, filed Jan. 22, 1969, and now abandoned.

BACKGROUND OF THE INVENTION

This invention relates to a device for measuring a quantity in an electric circuit and it has particular relation to a device for integrating a function of the product of voltage and current in an electric circuit.

For integrating various quantities such as watthours, var hours, volt-ampere hours and ampere hours in an electric circuit it has been the practice to employ electromotive devices such as induction-type meters. Attempts have been made to eliminate or reduce the mechanically-moving parts employed for such purposes. Thus in the Gambale U.S. Pat. No. 3,343,084 issued Sept. 19, 1967, a Hall generator is part of a static system which may be employed for the purpose of determining various quantities such as watthours in an electric system.

The Hall effect has been known for nearly 100 years but has found little application in the commercial electrical field until fairly recent years. Applications of the Hall effect for measurement purposes will be found in the Millar U.S. Pat. No. 2,550,492 issued Apr. 24, 1951 and in the Warner U.S. Pat. No. 2,585,797 issued Feb. 12, 1952. However, neither of these patents discloses a device which can be employed for integration purposes and neither is devoid of mechanical moving parts. A further example of a hall effect device for measuring instantaneous values of a quantity such as power flowing in an alternating current circuit is found in the Barabutes et al U.S. Pat. No. 3,189,815 issued June 15, 1965. Another showing of such a device will be found in the Barabutes U.S. Pat. No. 3,195,016 issued July 13, 1965.

SUMMARY OF THE INVENTION

In accordance with the invention a transducer is employed for producing an output current which is dependent on the instantaneous value of a variable quantity appearing in an electric circuit. The preferred embodiment of the invention comprises the combination of a Hall effect device for producing a direct-current component which is dependent on the power in an electric circuit and a channel wherein two mercury electrodes are separated by an electrolyte comprising a solution of a mercury salt through which the direct current is passed. The position of the solution represents an integration of the power being measured and a scale associated with the solution may be calibrated in terms of the energy represented by the position of the solution. This combination is devoid of relatively movable mechanical parts and is simple and compact in structure.

BRIEF DESCRIPTION OF THE DRAWINGS

Objects of the invention will be apparent from the following description taken in conjunction with the accompanying drawings, in which:

FIG. 1 is a schematic view with parts shown in perspective of an embodiment of the invention, FIG. 2 is a view of a part of the system of FIG. 1 together with a modification adapting the system to respond to vars in an electric circuit, FIG. 3 is a view of a portion of FIG. 1 with modifications for causing the resulting system to respond to volt amperes in an electric circuit, FIG. 4 is a view of a portion of a system of FIG. 1 together with modifications causing the system to respond to power in a direct current circuit, FIG. 5 is a schematic view with parts shown in block form and parts shown in elevation arranged to integrate current in a polyphase-alternating-current circuit.

DESCRIPTION OF THE PREFERRED EMBODIMENTS

Figure 6:
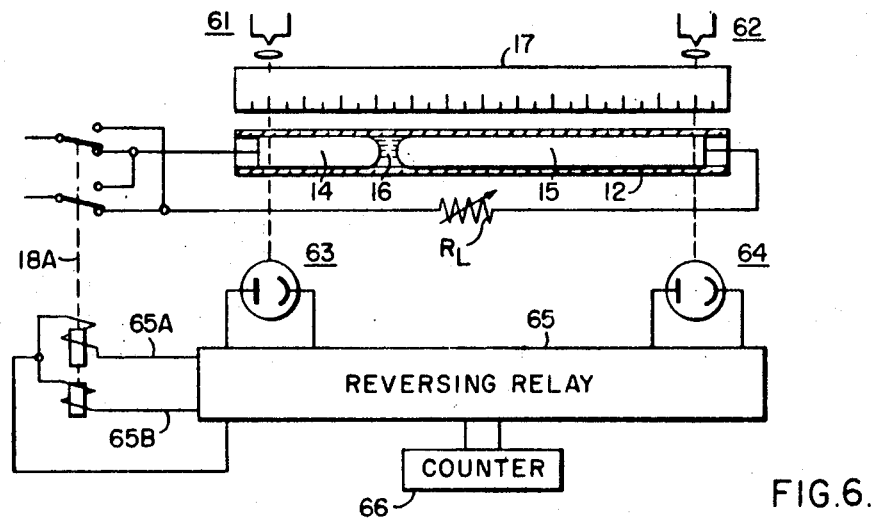
FIG. 6 is a schematic view with parts shown in block form and parts shown in elevation showing an arrangement for expanding the total capacity of this system illustrated in FIG. 1.

Referring to the drawings FIG. 1 shows a Hall-effect device 1 which is responsive to power flowing in a circuit represented by conductors L1 and L2. The device 1 will herein be referred to as a Hall generator. Design information for one satisfactory form thereof may be obtained from con-ference paper CP 59–875 published by the American Institute of Electric Engineers 33 West 39th St., New York City. These conductors are utilized for energizing a load 3 from a source of alternating current 5. Although the frequency of the source 5 may be selected from a wide range of frequencies it will be assumed for the present purposes that the source 5 is a single-phase alternating-current source operating at a power frequency of 60 Hertz.

The Hall-effect device 1 includes a C-shaped soft magnetic structure 7 having an air gap 8 within which a Hall plate 9 is located. A winding 10 surrounds a portion of the magnetic structure 7. When suitably energized from an alternating source the winding 10 directs an alternating magnetic flux $\phi$ through the air gap 8 and the Hall plate 9. As employed in FIG. 1 arrows represent instantaneous directions of flow. By inspection of FIG. 1 it will be noted that the winding 10 is connected in the conductor L2 for energization by the line current $I_L$.

For supplying a control current $I_C$ to the Hall plate 9 a transformer 11 has a primary winding 11P connected across the conductors L1 and L2. A secondary winding 11S of the transformer is connected through a resistor $R_C$ to direct a control current $I_C$ across the Hall plate 9. As well-known in the art, and as pointed out below, the Hall generator may have its input terminals connected to provide an output representing active, reactive or apparent power which may be measured as watts, vars or volt-amperes respectively. In FIG. 1, the connections are intended to provide an output current having a characteristic dependent on active power or watts of the circuit L1, L2.

The output voltage of the Hall plate is connected through a load impedance $R_L$ to send current via lines 12A and 12B through a channel of an integrating device D. This device essentially is an electrolytic cell and comprises a tube 12 of insulating material such as transparent glass which has at its opposing ends two mercury electrodes 14 and 15 separated by a layer or body 16 of an electrolyte comprising, for example, a solution of a mercury salt. An integrating device of this general type is described in the Corrsin U.S. Pat. No. 3,045,178, issued July 17, 1962, which discloses a water solution of potassium iodide and mercury iodide as an electrolyte.

In a preferred form, the tube may have a diameter such that opposed faces of the mercury electrodes are held practically parallel with each other and normal to the axis of the tube. The average direct current in the output circuit of the Hall plate is proportional to power or watts and is integrated by the integrating device D to indicate energy or watthours.

The flow of direct current through the electrolyte 16 in one direction causes a deposition of mercury on the electrode 15 and a dissolution of an exactly equal quantity of mercury from the electrode 14 in the electrolyte 16. Flow of current in the opposite direction causes a deposition of mercury on the electrode 14 and a dissolution of an equal quantity of mercury from the electrode 15. The tube 12 has preferably a uniform bore and the electrolyte 16 migrates along the tube 12 by a distance proportional to the quantity of the average direct current which is passed therethrough and in a direction dependent on the direction of flow of the average direct current. This quantity is proportional to the number of watthours of energy supplied by the source 5 to the load 3. A scale 17 adjacent to the tube 12 measures the position of the electrolyte body 16 and may be calibrated to read directly the energy in watthours delivered by the source 5 to the load 3.

The direction of movement of the electrolyte 16 in the tube 12 is dependent on the direction of flow of current therethrough. The direction may be selected by means of a reversing switch 18 through which the output of the Hall plate is supplied to the tube 12. Over a period of time the extent of the movement depends on the average direct current during said time period.

The output of the Hall generator 1 is illustrated in the aforesaid U.S. Pat. No. 2,550,492. As shown in this patent, $$Eh = K[VI \cos \theta - VI \cos (2\omega t + \theta)]$$

in which:
$Eh$ = Hall plate output voltage
$K$ = a constant
$V$ = voltage of source
$I$ = line current supplied by source
$\theta$ = phase angle between $V$ and $I$
$\omega$ = radias frequency = $2\pi f$
$t$ = time The direct current term ($VI \cos \theta$) is proportional to real or active power. The average direct current in the output has a value of zero when no power is being transmitted over the conductors L1 and L2.

It is the usual practice of electric utilities to have the meters of its customers read at regular intervals. The meter reader may be instructed to operate the reversing switch 18 for the purpose of reversing the direction of movement of the electrolyte 16 after each meter reading. Under such circumstances the tube 12 may have a length sufficient to read the maximum amount of energy which can be supplied by the source 5 to the load 3 during any interval between successive meter readings.

If the tube 12 is to be located out-of-doors in climates which may subject the electrolyte to freezing weather it may be located within an enclosure 19 which is maintained at a temperature high enough to prevent freezing of the electrolyte. The Corrsin patent discloses electrodes and electrolytes suitable for low-temperature operation.

If reactive-volt-ampere hours or var hours are to be measured, the components located within the box B in FIG. 1 may be replaced by the components within the box BA of FIG. 2. The only change entailed by this substitution is the introduction of a phase shifter between the secondary winding 11S of the transformer 11 and the input leads 11A and 11B for the Hall plate 9. This phase shifter may provide an output arranged to lag the voltage applied thereto or lead the voltage supplied thereto by 90° dependent upon whether lagging or leading var hours are to be measured.

If volt-ampere hours are to be measured, the box B of FIG. 1 may be replaced by the box BB of FIG. 3. The only effect of this substitution is to insert a rectifier 31 between the secondary winding 11S of the transformer 11 and the input leads 11A and 11B of the Hall plate 9.

If the source 5 is a direct-current source, the box B may be replaced by the box BC of FIG. 4. This substitution replaces the transformer 11 of FIG. 1 by a voltage divider 11D dependent on the direct voltage between the lines L1 and L2.

In some applications, it is desired to obtain a measurement of ampere hours. To this end, the mercury electrodes 14 and 15 may be energized in accordance with the direct current corresponding to a current flowing in the electric system which is to be measured. For example, in FIG. 5, a polyphase source 5A, assumed to be three-phase, energizes a three-phase load 3A through a three-phase circuit having phase conductors LA, LB, LC and a neutral conductor LN. Current transformers CT derive from the polyphase circuit a current to be measured. Thus the derived current may be a single-phase, alternating current representing the positive-sequence component of the polyphase circuit as described in the Petzinger U.S. Pat. No. 2,513,891. This positive-sequence component of current is rectified in a full-wave rectifier 52 and the rectified output is applied to the mercury electrodes 14 and 15.

As pointed out in the Petzinger patent, distribution systems of the polyphase type operate with phase voltages which are substantially equal and balanced. Under such circumstances no negative-sequence or zero-sequence power or energy is supplied by the source and the positive-sequence component of current represents the positive-sequence power flowing in the polyphase system. Thus the position of the electrolyte 16 is dependent on the ampere hours of the positive-sequence component of current supplied by the associated polyphase electric system, and corresponds to the energy supplied.

In order to reduce the length of the tube 12 the polarity of the voltage applied to the mercury electrodes 14 and 15 is reversed when the electrolyte 16 reaches predetermined positions adjacent the ends of the tube. By counting the number of reversals occurring during a billing period, the value of the quantity being measured during such billing period may be ascertained.

The reversal of polarity may be effected manually by operation of the reversing switch 18 in FIG. 1 through which the output of the Hall plate 9 is applied to the mercury electrodes 14 and 15, and the number of reversals may be mentally noted. In a preferred embodiment of the invention the reversals takes place automatically. A structure for producing automatic reversals is illustrated in FIG. 6. In FIG. 6, an optical projector 61 directs a narrow beam or pencil of radiant energy such as light across the tube 12 towards an associated photocell 63. In FIG. 6, this beam or pencil of light is located adjacent the left-hand end of the tube 12. In an analogous manner, an optical projector 62 directs a beam or pencil of light across the right-hand end of the tube 12 towards a photocell 64.

When the light beam from the projector 61 is interrupted by the opaque mercury electrode 14 the photocell 63 receives no light and blocks the passage of current therethrough. However, the electrolyte 16 is substantially transparent to light and when it reaches the path of the beam or pencil of light emitted by the projector 61 it permits the light to reach the photocell 63 and this light places the photocell 63 in a conductive condition as well understood in the art. In an analogous manner when the electrolyte 16 reaches the path of the light emitted by the projector 62 the light is permitted to reach the photocell 64 and places the photocell 64 in a conductive condition.

The photocells 63 and 64 controlled a conventional reversing relay 65 which may be of the type employing a flip-flop. Thus when the photocell 63 produces an output or has high conductivity the relay 65 produces a first output 65A. In an analogous manner, when the photocell 64 permits the passage of current therethrough, the relay 65 produces a second output 65B. These outputs operate to reverse a conventional reversing switch 18A as the electrolyte 16 nears each end of the tube 12. A conventional counter 66 is provided for counting the number of operations of the relay 65. This count taken together with the reading of the position of the electrolyte 16 at the time of reading supplies all information required to ascertain the amount of the quantity being measured for a billing period.

Figure 7:
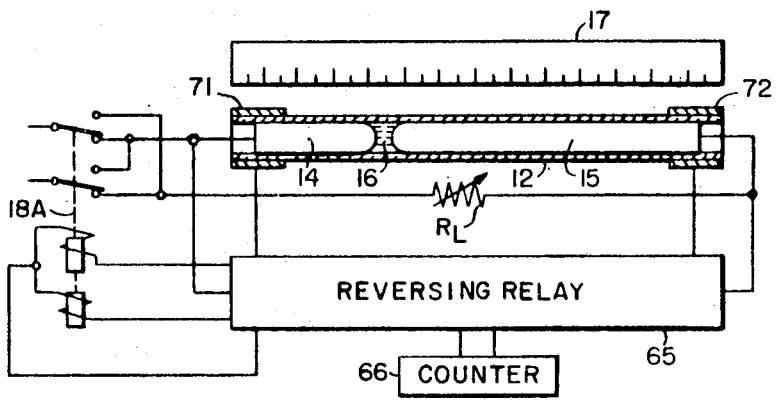
FIG. 7 is a schematic view with parts shown in block form and parts in schematic form illustrating a modification of the system of FIG. 6.

FIG. 7 shows an alternative to the employment of photocells for triggering the relay 65 when the electrolyte body 16 reaches a position adjacent each end of the tube 12. Bands of electroconductive materials 71 and 72 surround the respective end regions of the tube 12. Each band together with the associated mercury electrode form the plates of a capacitor which are separated by a dielectric formed by the glass of the tube 12. The capacitance of each of the capacitors is substantially constant as long as the electrolyte body 16 is in the middle portion of the tube 12. When the electrolyte body 16 enters the space between the plates of one of the capacitors the capacitance of such capacitor decreases and the decrease in capacitance is employed for triggering the relay 65.

In FIG. 1 the output of the Hall plate 9 is connected to the switch 18 and the scale 17 may be calibrated to read directly the energy in watthours. The output of the Hall plate 9 includes an alternating component which is proportional to the apparent power or volt amperes supplied by the source 54 to the load 3. The alternating component may be segregated, rectified and applied to the integrating device by the circuit shown in FIG. 8 for the purpose of measuring volt-ampere hours. This circuit replaces the connection of the Hall plate 9 to the switch 18 in FIG. 1.

Figure 8:
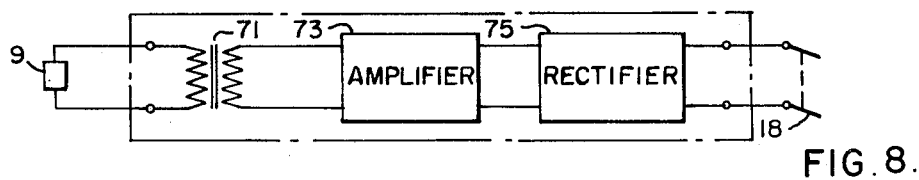
FIGS. 8 and 9 are schematic views illustrating further embodiments of the invention.

In FIG. 8 the output of the Hall plate 9 is connected to the switch 18 through a device 71 for segregating the desired alternating component. The output of the device 71, which is shown as a transformer, is amplified if necessary by an amplifier 73. The output of the amplifier is rectified, preferably by a full-wave rectifier 75 and filtered if desired. The output of the rectifier is supplied through the switch 18 to the integrating device D. The scale 17 may be calibrated to read directly the apparent energy in volt-ampere hours.

Figure 9:
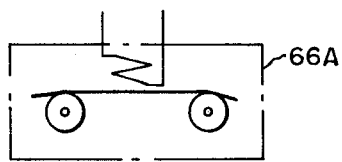

In FIGS. 6 and 7 a counter 66 is shown for counting the pulses representing reversals of the integrating device. Conveniently the counter 66 may be replaced by a magnetic recorder 66A which is represented in FIG. 9. A suitable magnetic recorder is illustrated in U.S. Pat. No. 3,148,329 which issued Sept. 8, 1964. The pulses representing reversals of the integrating device are supplied to a first recording head of the magnetic recorder and timing signals may be supplied to a second recording head of the magnetic recorder as illustrated in the magnetic-recorder patent.

The recording of the pulses and signals may continue for a desired period of time. The magnetic tape then may be transferred to suitable translating equipment or a computer for the purpose of totalizing the pulses or deriving information from the tape in a manner well understood in the art. Each pulse represents a predetermined amount of the quantity being measured.

I claim as my invention:

1. A device for electrically integrating and indicating the product of voltage and current components of power flowing in an electric circuit, said device comprising: an electrolytic cell including a body of insulating material having a channel therethrough, two electrodes formed of an electrochemically dissoluble material filling said channel at opposite ends thereof, a finite body of electrolyte material separating said two electrodes in said channel, and a scale for visually indicating the position of the electrolyte body along the body of insulating material; a Hall generator having first and second input terminals and output terminals, said first and second input terminals being responsive to said voltage and current components, respectively, so as to generate a direct current signal at said output terminals having variable signal levels corresponding to changes in the product of said voltage and current components; a reversing switch means having first and second conditions and connecting said output terminals of said Hall generator across said two electrodes, wherein said direct current signal flows in one direction between said two electrodes when said reversing switch means is in said first condition and in an opposite direction when said reversing switch means is in said second condition such that the electrolyte body is moved in either of opposite directions in said channel a distance responsive to the level of said direct current signal and the duration that the direct current signal flows through said two electrodes; detector means responsive to the positioning of the electrolyte body adjacent either of the channel ends, said detector means being operatively connected to said reversing switch means for effecting changes between said first and second conditions thereof upon the electrolyte body moving adjacent either of the channel ends; and a counter means operatively connected to said detector means for registering each reversal of movement of the electrolyte body such that the watthours of said power flow is indicated by the count of said counter means increased by the position of said electrolyte body in accordance with the total distance traveled by the electrolyte body in said channel.

2. A device as claimed in claim 1 wherein said detector means comprises means for applying radiant energy to a predetermined point in the path of travel of said electrolyte body, and said detector has a state dependent on the presence or absence of said radiant energy at the detector, said electrolyte body and one of said electrodes having first and second characteristics respectively such that when either one of said electrolyte body and said one electrode is at the predetermined point the applied radiant energy is transmitted to the detector and when the other one of said electrolyte body and said one electrode is at the predetermined point the applied radiant energy is blocked from the detector means.

3. A device as claimed in claim 1 wherein said detector means comprises a plate spaced from a first one of the electrodes at said predetermined point for forming a capacitor having said plate and said first one of the electrodes as capacitor plates, said electrolyte body having a characteristic such that when it reaches said predetermined point the capacitance of said capacitor is changed, and means responsive to said change in capacitance for reversing the first and second conditions of said reversing switch means.

4. The device as claimed in claim 1 wherein said reversing switch means includes a relay means connected to said detector means for effecting either of said first and second conditions.

* * * * *